United States Patent [19]

L'Eplattenier et al.

[11] 4,008,225
[45] Feb. 15, 1977

[54] PROCESS FOR THE MANUFACTURE OF BIS-AZOMETHINE METAL COMPLEX COLORANTS

[75] Inventors: Francois L'Eplattenier; Laurent Vuitel, both of Therwil; André Pugin, Riehen, all of Switzerland

[73] Assignee: Ciba-Geigy Corporation, Ardsley, N.Y.

[22] Filed: July 28, 1975

[21] Appl. No.: 599,444

[30] Foreign Application Priority Data

July 31, 1974 Switzerland .................... 10585/74

[52] U.S. Cl. .................... 260/240 G; 260/429 C; 260/566 F
[51] Int. Cl.² .................... C07F 3/06; C07F 3/08; C07F 15/00
[58] Field of Search ........ 260/240 G, 429 C, 566 F

[56] References Cited

UNITED STATES PATENTS

| | | | |
|---|---|---|---|
| 2,418,747 | 4/1947 | Bavley | 260/566 F X |
| 3,632,618 | 1/1972 | Pacheco et al. | 260/566 F X |
| 3,687,991 | 8/1972 | Gaeng et al. | 260/429 C |
| 3,864,371 | 2/1975 | Inman et al. | 260/429 C |
| 3,875,200 | 4/1975 | L'Eplattenier et al. | 260/429 C X |
| 3,896,113 | 7/1975 | Kaul | 260/240 G |

FOREIGN PATENTS OR APPLICATIONS 1,075,582   7/1967   United Kingdom ............ 260/566 F

*Primary Examiner*—Allen B. Curtis
*Attorney, Agent, or Firm*—Vincent J. Cavalieri

[57] ABSTRACT

Process for the manufacture of bis-azomethine metal complex colorants of the formula

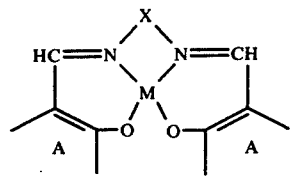

wherein A denotes an isocyclic or heterocyclic aromatic radical, X denotes an isocyclic or heterocyclic aromatic radical to which the N-atoms are bonded in the o-position or peri-position, or an alkylene radical containing 2–8 C atoms, and M denotes a divalent transition metal ion, a zinc ion or cadmium ion, characterized in that an o-hydroxyaldimine compound of the formula

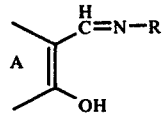

wherein A has the abovementioned meaning and R denotes an alkyl, cycloalkyl or aryl radical, is reacted with a diamine of the formula

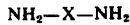

wherein X has the abovementioned meaning, in the molar ratio of 2:1, in the presence of a compound which donates a divalent transition metal cation, zinc ion or cadmium ion.

13 Claims, No Drawings

PROCESS FOR THE MANUFACTURE OF BIS-AZOMETHINE METAL COMPLEX COLORANTS

The manufacture of bis-azomethine metal complex colorants by condensation of o-hydroxyaldehydes with diamines and subsequent separate metallisation, or simultaneous metallisation which can be carried out by the so-called one-pot process, of the resulting bis-azomethine colorants is known from numerous patent specifications and literature references. The manufacture of the o-hydroxyaldehyde is frequently difficult or involved, as, for example, in the case of the manufacture of 1-formyl-2-hydroxy-3-carboxylic acid arylamide by reaction of the corresponding carboxylic acid with thionyl chloride and arylamine and saponification of the resulting product, or the yield is too low, as, for example, in the manufacture of the aldehyde of 2,4-dihydroxyquinoline, where the yield is at most 60% of theory.

A new process, which is simple to carry out, for the manufacture of bis-azomethine metal complex colorants of the formula

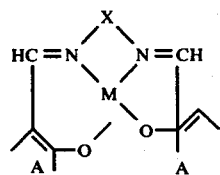

wherein A denotes an isocyclic or heterocyclic aromatic radical, X denotes an isocyclic or heterocyclic aromatic radical to which the N atoms are bonded in the o-position or peri-position, or an alkylene radical containing 2–8 C atoms, and M denotes a divalent transition metal ion, a zinc ion or a cadmium ion, has now been found, which is characterised in that an o-hydroxyaldimine compound of the formula

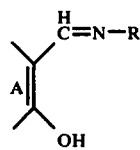

wherein A has the abovementioned meaning and R denotes an alkyl, cycloalkyl or aryl radical, preferably a phenyl radical which is optionally substituted by halogen atoms or alkyl or alkoxy groups containing 1–4 C atoms, is reacted with a diamine of the formula

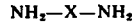

wherein X has the abovementioned meaning, in the molar ratio of 2:1, in the presence of a compound which donates a divalent transition metal cation, zinc ion or cadmium ion.

The preferred starting material is a compound of the formula II, wherein A denotes a benzene, naphthalene, anthraquinone, pyridine, pyrimidine, pyrazole, imidazole, quinoline, isoquinoline or coumarin radical, and this radical can be substituted by one or more alkyl groups containing 1–6 C atoms or aryl radicals, for example phenyl radicals, to which halogen atoms, especially chlorine atoms, or alkyl groups with 1–4 C atoms, especially methyl groups, can optionally also be bonded. A can furthermore be substituted by hydroxyl, cyano, nitro or carboxyl groups, alkanoylamino groups containing 2–6 C atoms, benzoylamino or alkylsulphamoyl groups containing 1–6 C atoms or carbamoyl groups which can contain N-phenyl radicals optionally substituted by halogen or by alkyl or alkoxy groups containing 1–6 C atoms.

Compounds of particular interest as starting materials are those in which A denotes a naphthalene radical which carries a carboxyl or carbamoyl group in the o-position relative to the hydroxyl group, or in which A denotes a quinoline or coumarin radical. The following may be mentioned as examples of starting compounds of the formula II: 2-hydroxynaphthoic acid 3-anilide-1-N-phenylaldimine, 2-hydroxynaphthoic acid 3-p-chloroanilide-1-N-phenylaldimine, 4-hydroxycoumarin-3-N-phenylaldimine, 2,4-dihydroxyquinoline-3-N-phenylaldimine, 2,4-dihydroxy-7,8-dichloroquinoline-3-N-phenylaldimine, 2,6-dihydroxy-4-methyl-5-cyanopyridine-3-N-phenylaldimine, 1-phenyl-3-carbamoyl-5-hydroxypyrazole-4-N-phenylaldimine, 1-phenyl-3-methyl-5-hydroxypyrazole-4-N-phenylaldimine, 2-phenyl-4,6-dihydroxypyrimidine-5-N-phenylaldimine, 2-p-toluyl-4,6-dihydroxypyrimidine-5-N-phenylaldimine, 2-hydroxynaphthoic acid 3-o,o'-dichloroanilide-1-N-phenylaldimine, 2-hydroxynaphthoic acid 3-p-fluoroanilide-1-N-phenylaldimine, 2-hydroxynaphthoic acid 3-o-chloroanilide-1-N-phenylaldimine, 2,4-dihydroxy-6-metyl-quinoline-3-N-phenylaldimine, 2,4-dihydroxy-6-chloro-quinoline-3-N-phenylaldimine, 2,6-dihydroxy-4-methyl-5-carbonamidepyridine-3-N-phenylaldimine, 2,4,6-trihydroxypyrimidine-5-N-phenylaldimine and 2-amino-4,6-dihydroxypyrimidine-5-N-phenylaldimine.

The abovementioned starting compounds of the formula II are preferably manufactured either by reaction of the compound of the formula

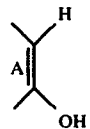

wherein A has the abovementioned meaning, with a formamidine of the formula

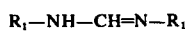

wherein $R_1$ denotes an aryl radical, preferably a phenyl radical, or by reaction with an ortho-formic acid ester of the formula

wherein $R_2$ denotes an alkyl radical with 1–6 C atoms, and an amine of the formula

wherein $R_1$ has the above meaning.

The formation of the Schiff's bases of the formula II in general takes place smoothly and with very good yields.

Amongst the diamines of the formula III, aromatic o-diamines of the formula

(VIII)

wherein $Z_1$ and $Z_2$ denote hydrogen, halogen, alkyl containing 1–6 carbon atoms, alkoxy containing 1–6 carbon atoms, arylalkyl, containing 8–10 carbon atoms, trifluoromethyl, nitro, carboxyl, arylcarbamoyl, alkylcarbamoyl with 2–6 C atoms, arylsulphamoyl, alkylsulphamoyl with 1–6 C atoms, alkanoylamino with 2–6 C atoms, aroylamino or alkylsulphonylamino with 1–6 C atoms, or wherein the two radicals $Z_1$ and $Z_2$ form a fused benzene ring or hetero-ring, for example to form naphthalene, anthraquinone, benzimidazole or benzimidazolone, are used in particular.

The following may be mentioned as examples of diamines: 1,2-phenylenediamine, 4-chloro-1,2-phenylenediamine, 4,5-dichloro-1,2-phenylenediamine, 4-methyl-1,2-phenylenediamine, 4,5-dimethyl-1,2-phenylenediamine, 3,5-dimethyl-1,2-phenylenediamine, 4-methoxy-1,2-phenylenediamine, 4,5-dimethoxy-1,2-phenylenediamine, 4-trifluoromethyl-1,2-phenylenediamine, 4-phenylisopropyl-1,2-phenylenediamine, 1,2-diaminonaphthalene, 2,3-diaminonaphthalene, 1,2-diaminoanthraquinone, 2,3-diaminoanthraquinone, 2-methyl-5,6-diaminobenzimidazole, 1-methyl-5,6-diaminobenzimidazol-2-one, 1,8-naphthylenediamine, 4-phenoxy-1,2-phenylenediamine, 4-methylsulphonyl-1,2-phenylenediamine, 4-ethylsulphonyl-1,2-phenylenediamine, 4-carboxy-1,2-phenylenediamine, 4-cyano-1,2-phenylenediamine, 4-acetylamino-1,2-phenylenediamine, 4-benzoylamino-1,2-phenylenediamine, 4-nitro-1,2-phenylenediamine, 4-methoxy-5-chloro-1,2-phenylenediamine, 4-methyl-5-chloro-1,2-phenylenediamine, 4-methoxy-5-phenoxy-1,2-phenylenediamine, 4-ethyl-1,2-phenylenediamine, 3,4-diaminopyridine, 2,3-diaminoquinoxaline, 5,6-diaminobenzimidazol-2-one, 6,7-diamino-2,3-dihydroxyquinoxaline and 6,7-diamino-2,3-dihydrophthalazine-1,4-dione.

The following may be mentioned as examples of aliphatic diamines: ethylenediamine, 1,2- and 1,3-propylenediamine, 1,2-, 1,3- and 1,4-butylenediamine, 1,5-pentamethylenediamine and 1,6-hexamethylenediamine.

Examples of compounds which donate a divalent metal ion are the acetate, stearate, chloride, sulphate, nitrate and phosphate of zinc and cadmium, but especially of nickel and copper.

The condensation of the o-hydroxy-N-arylaldimine compound of the formula II with the o-diamine, and metal complex formation, is suitably carried out in a polar, preferably organic solvent. Examples of solvents which may be mentioned are ethylene glycol, methylcellosolve, glacial acetic acid, dimethylformamide, o-dichlorobenzene, nitrobenzene and carbitol.

The reaction takes place at elevated temperatures, preferably between 50° C and the boiling point of the solvent used.

Since the metal complex colorants obtained are sparingly soluble in the solvents mentioned, they can easily be isolated by filtration. Any impurities can be removed by elution.

The colorants obtained are valuable pigments which can be used, in a finely divided form, for pigmenting high-molecular organic material, for example cellulose ethers and cellulose esters, such as ethylcellulose, cellulose acetate, cellulose butyrate, natural resins or synthetic resins, such as polymerisation resins or condensation resins, for example aminoplasts, especially urea-formaldehyde and melamine-formaldehyde resins, alkyd resins, phenoplasts, polycarbonates, polyesters, polyamides or polyurethanes, polyolefines, such as polyethylene or polypropylene, polyvinyl chloride, polystyrene, polyacrylonitrile, polyacrylic acid esters, rubber, casein, silicones, and silicone resins, individually or as mixtures.

For these purposes it is immaterial whether the high-molecular compounds mentioned are in the form of plastic masses or melts or in the form of spinning solutions, lacquers, paints or printing inks. Depending on the end use, it proves advantageous to use the new pigments as toners or in the form of preparations.

In addition to the pure pigment, the preparations can, for example, also contain natural resins, such as abietic acid or its esters, ethylcellulose, cellulose acetobutyrate, alkaline earth metal salts of higher fatty acids, fatty amines, such as stearylamine or rosin-amine, vinyl chloride/vinyl acetate copolymers, polyacrylonitrile or polyterpene resins or water-soluble dyestuffs, for example dyestuff-sulphonic acids or their alkaline earth metal salts.

In the examples which follow the parts, unless stated otherwise, denote parts by weight. Parts by weight bear the same relation to parts by volume as the gram to the cubic centimetre.

EXAMPLE 1

16.1 parts of 2,4-dihydroxyquinoline and 21.6 parts of N,N'-diphenylformamidine are suspended in 50 parts by volume of ethylene glycol. The mixture is warmed to 170° C and the resulting solution is stirred for 30 minutes at this temperature. 100 parts by volume of alcohol are added dropwise at 130° C; the residue is filtered off at 70° C, washed well with alcohol and dried in vacuo at 80° C. 26.5 parts (100% of theory) of light yellow 2,4-dihydroxyquinoline-3-N-phenylaldimine are obtained.

| Microanalysis: | % | C | H | N |
|---|---|---|---|---|
|  | calculated | 72.71 | 4.57 | 10.59 |
|  | found | 73.0 | 4.8 | 11.1 |

The reaction can also be carried out without solvents or in DMF, o-dichlorobenzene and nitrobenzene.

EXAMPLE 2

89.1 parts of 2-hydroxynaphthoic acid 3-p-chloroanilide and 64.8 parts of N,N'-diphenylformamidine are introduced into 200 parts by volume of ethylene glycol and the mixture is warmed to 175° C. The resulting brown solution is stirred for 60 minutes at this temperature and then cooled to 100° C, and 300 parts by volume of alcohol are added. The yellow-orange residue is filtered off at room temperature, washed with alcohol and dried. 90.4 parts (75.3% of theory) of 2-hydroxynaphthoic acid 3-p-chloroanilide-1-N-phenylaldimine are obtained.

| Microanalysis: | % | C | H | N | Cl |
|---|---|---|---|---|---|
| | calculated | 71.91 | 4.27 | 6.98 | 8.84 |
| | found | 71.6 | 4.1 | 6.8 | 9.0 |

The table which follows describes the manufacture of further aldimines of the formula II according to the process of Example 1 and 2, with

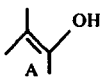

having the meaning indicated in Column II.

Table 1

| Example No. | A⟩=⟨OH | Microanalysis calculated / found | | | | Yield % |
|---|---|---|---|---|---|---|
| | | C | H | N | Cl | |
| 3 | naphthol-CONH-phenyl | 78.67 / 78.2 | 4.95 / 4.9 | 7.64 / 7.2 | | 66 |
| 4 | 2-phenyl-5-methyl-4,6-dihydroxypyrimidine | 70.09 / 70.3 | 4.49 / 4.7 | 14.42 / 14.6 | | 94 |
| 5 | 2-(p-tolyl)-5-methyl-4,6-dihydroxypyrimidine | 70.80 / 70.7 | 4.95 / 5.0 | 13.76 / 13.8 | | 88 |
| 6 | 5-methyl-2,4,6-trihydroxypyrimidine | 57.13 / 57.2 | 3.92 / 3.9 | 18.7 / 18.4 | | 90 |
| 7 | 7,8-dichloro-3-methyl-2,4-dihydroxyquinoline | 57.67 / 57.6 | 3.02 / 3.1 | 8.40 / 8.4 | 21.28 / 21.4 | 89 |
| 8 | 3-cyano-4-methyl-2,6-dihydroxy-5-methylpyridine | 66.39 / 66.6 | 4.37 / 4.5 | 16.59 / 16.8 | | 69 |
| 9 | 3-carbamoyl-4-methyl-2,6-dihydroxy-5-methylpyridine | 61.98 / 61.0 | 4.82 / 5.1 | 15.49 / 14.6 | | 74 |

Table 1-continued

| # | Structure | C | H | N | | Yield |
|---|---|---|---|---|---|---|
| 10 | H₃C-C(=N-)-C(CH₃)=C(OH)-CH₃ with N-NH-phenyl | 73.62<br>73.6 | 5.45<br>5.4 | 15.15<br>15.0 | | 80 |
| 11 | H₂NOC-C(=N-N(phenyl))-C(CH₃)=C(OH)-CH₃ | 66.65<br>66.6 | 4.60<br>4.5 | 18.29<br>18.2 | | 89 |
| 12 | benzimidazole-fused pyridine with NC, CH₃, CH₃, OH substituents | 69.5<br>69.1 | 3.68<br>3.7 | 17.06<br>16.9 | | 94 |
| 13 | 6-chloro-4-hydroxy-3-methyl-2-hydroxyquinoline | 64.32<br>64.0 | 3.68<br>3.8 | 9.38<br>9.5 | 11.89<br>12.1 | 88 |
| 14 | 6-methyl-4-hydroxy-3-methyl-2-hydroxyquinoline | 73.38<br>73.5 | 5.0<br>5.1 | 10.07<br>10.2 | | 90 |
| 15 | 2-amino-4,6-dihydroxy-5-methylpyrimidine | 57.13<br>57.2 | 3.92<br>3.9 | 18.17<br>18.4 | | 96 |
| 16 | 3-hydroxy-4-methylisoquinolin-1(2H)-one | 72.71<br>72.59 | 4.58<br>4.63 | 10.60<br>10.71 | | 97 |

EXAMPLE 17

16.2 parts of 4-hydroxycoumarin, 14.8 parts of orthoformic acid triethyl ester and 9.3 parts of aniline are initially introduced into 100 parts by volume of ethylene glycol. The stirred suspension is brought into solution at 150° C and slowly warmed to 180° C. The solution is stirred for 20 minutes at 180° C and then cooled to 130° C, and 50 parts by volume of methylcellosolve are added. The residue is filtered off at room temperature, washed well with alcohol and dried in vacuo at 80° C, whereby 23.7 parts (89% of theory) of 4-hydroxy-3-N-phenylaldimine-coumarin were obtained.

| Microanalysis: | % | C | H | N |
|---|---|---|---|---|
| | calculated | 72.44 | 4.17 | 5.27 |
| | found | 72.3 | 4.1 | 5.3 |

The anils of Examples 1 and 2 were also manufactured in good yields in accordance with this process.

EXAMPLE 18

2.64 parts of the anil manufactured according to Example 1, 0.54 part of o-phenylenediamine and 1.25 parts of nickel acetate tetrahydrate in 50 parts by volume of methylcellosolve are stirred for 3 hours at 120° C. The residue is filtered off at 100° C, washed with alcohol and acetone and dried. 2.35 parts (92.8%) of the yellow nickel complex of the formula

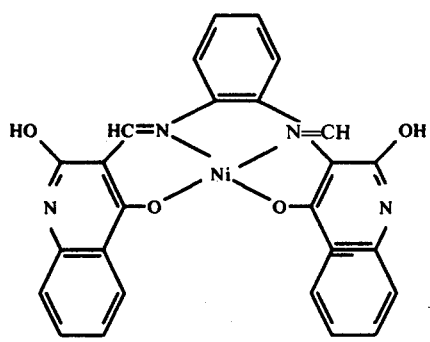

are obtained.

| Microanalysis: | % | C | H | N | Ni |
|---|---|---|---|---|---|
| | calculated | 61.57 | 3.17 | 11.04 | 11.57 |
| | found | 60.7 | 3.5 | 10.8 | 11.4 |

EXAMPLE 19

3.0 parts of 2,4-dihydroxyquinoline-3-N-octylaldimine, manufactured by reaction of the anil, manufactured according to Example 1, with n-octylamine, 1.25 parts of nickel acetate tetrahydrate and 0.54 part of o-phenylenediamine are stirred for 3 hours in 50 parts by volume of methylcellosolve at 120° C. The residue is filtered off hot, washed with alcohol and acetone and dried, giving 2.0 parts (80% of theory) of the metal complex of Example 14.

| Microanalysis: | % | C | H | N | Ni |
|---|---|---|---|---|---|
| | calculated | 61.57 | 3.17 | 11.04 | 11.57 |
| | found | 61.3 | 3.8 | 10.8 | 10.7 |

The following compounds of the formula (I), wherein A, X and M have the meaning indicated in Column II–III were manufactured analogously to Example 18.

Table 2

| Example No. | A | X | $M^{+2}$ | Yield | Shade in PVC |
|---|---|---|---|---|---|
| 20 | 2,4-dihydroxy-3-methylquinoline | 4-methylphenyl | Ni | 84.6 | yellow |
| 21 | 7,8-dichloro-2,4-dihydroxy-3-methylquinoline | phenyl | Ni | 80.7 | yellow |
| 22 | id. | 4-methylphenyl | Ni | 82.7 | yellow |
| 23 | 3-cyano-4,6-dimethyl-2-hydroxypyridone | phenyl | Ni | 86.8 | yellow |
| 24 | 3-cyano-4,6-dimethyl-2-hydroxypyridone | 4-trifluoromethylphenyl | Ni | 77.9 | yellow |

Table 2-continued

| Example No. | [A with =O and CH3 group] | X | M⁺² | Yield | Shade in PVC |
|---|---|---|---|---|---|
| 25 | [structure: pyridine with H₂NOC, CH₃, N, O, and N-phenyl-methyl] | [o-tolyl] | Ni | 100 | yellow-brown |
| 26 | [structure: N=CH, O, N-phenyl] | [o-tolyl] | Ni | 50.8 | yellow |
| 27 | [structure: phenyl-N=CH-C(OH)=C(CH3)-C(=O)-N] | [o-tolyl] | Ni | 100 | yellow |
| 28 | [structure: phenyl-N=CH-C(OH)=C(CH3)-C(=O)-N] | [4-CF₃-phenyl] | Ni | 96.5 | yellow |
| 29 | [structure: phenyl-N=CH-C(OH)=C(CH3)-C(=O)-N] | [H₃C-C(=N)-NH-dimethylphenyl] | Ni | 87.9 | yellow-orange |
| 30 | [structure: p-tolyl-N=CH-C(OH)=C(CH3)-C(=O)-N] | [o-tolyl] | Ni | 100 | yellow |
| 31 | [structure: phenyl-C(=O)-C(CH3)=C(O)-] | [o-tolyl] | Ni | 95.4 | yellow |
| 32 | [structure: phenyl-C(=O)-C(CH3)=C(O)-] | [o-tolyl] | Cu | 87.6 | olive |

Table 2-continued
| Example No. | 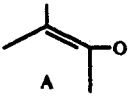 A | X | $M^{+2}$ | Yield | Shade in PVC |
|---|---|---|---|---|---|
| 33 | 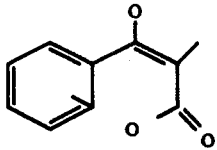 | 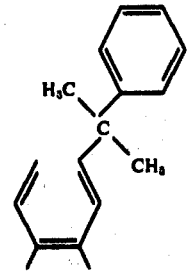 | Ni | 86.2 | yellow |
| 34 | 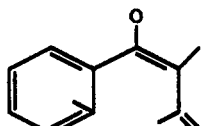 | 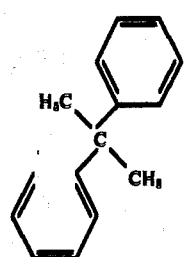 | Cu | 91.7 | green-yellow |
| 35 | 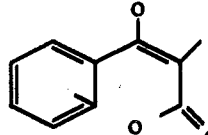 | 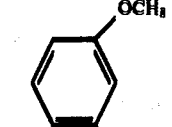 | Ni | 68.7 | brown-yellow |
| 36 | 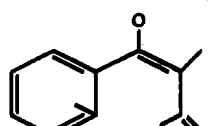 | 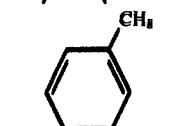 | Ni | 96.1 | yellow |
| 37 | 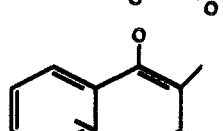 | 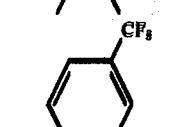 | Ni | 93.7 | yellow |
| 38 | 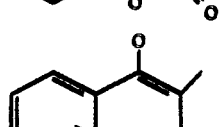 | 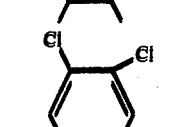 | Ni | 100 | yellow |
| 39 | 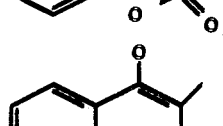 | 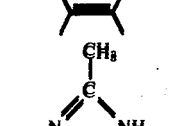 | Ni | 89.2 | yellow |
| 40 | 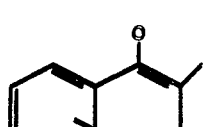 | 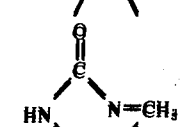 | Ni | 37.8 | brown-red |

Table 2-continued
| Example No. | 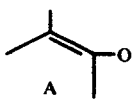 A | X | M⁺² | Yield | Shade in PVC |
|---|---|---|---|---|---|
| 41 | 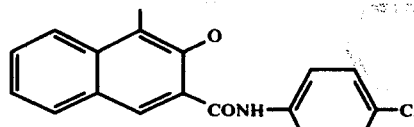 | 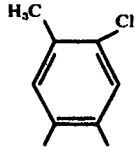 | Ni | 60.5 | orange |
| 42 | 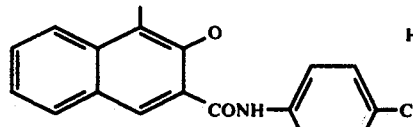 | 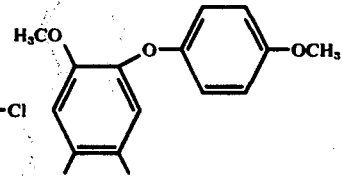 | Ni | 59.0 | scarlet |
| 43 | 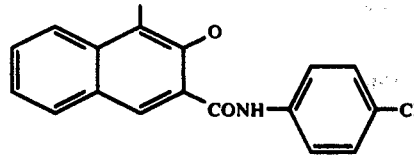 | 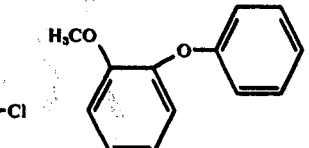 | Ni | 79.4 | orange |
| 44 | 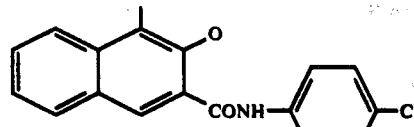 | 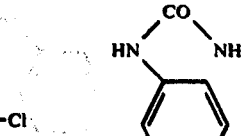 | Ni | 72.9 | red |
| 45 | 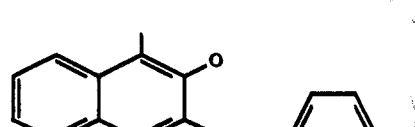 | 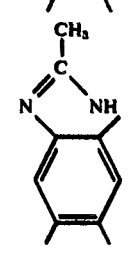 | Ni | 71.9 | brown-red |
| 46 | 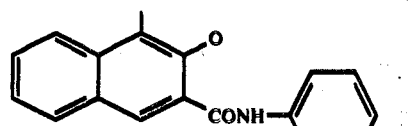 |  | Zn | 68 | orange |
| 47 | 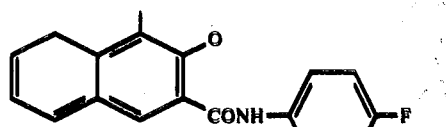 |  | Ni | 91 | red |
| 48 | 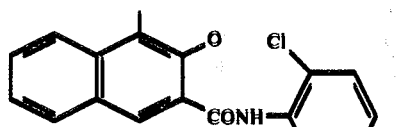 |  | Ni | 81 | red |
| 49 | 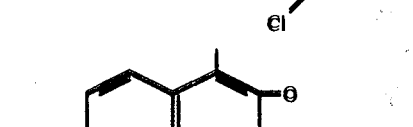 |  | Ni²⁺ | 68% | orange |

Table 2-continued

| Example No. | 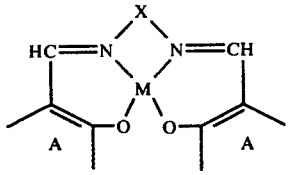 X | M⁺² | Yield | Shade in PVC |
|---|---|---|---|---|
| 50 | (structure) | $Ni^{2+}$ | 78% | yellow |

EXAMPLE 51

4.0 parts of the anil manufactured according to Example 2, 0.54 part of o-phenylenediamine and 1.25 parts of nickel acetate tetrahydrate are stirred for 4 hours in 200 parts by volume of glacial acetic acid at 100° C.

The red residue is filtered off hot, washed with alcohol and acetone and dried. 2.75 parts (70.5% of theory) of the metal complex are obtained.

| Microanalysis: | % | C | H | N | Cl | Ni |
|---|---|---|---|---|---|---|
| | calculated | 64.64 | 3.35 | 7.18 | 9.08 | 7.52 |
| | found | 65.0 | 3.5 | 7.3 | 9.1 | 7.1 |

The same process is carried out at the same time without nickel acetate tetrahydrate. The residue is washed with alcohol and dried, whereby only 1.0 part (27.7% of theory) of the bis-azomethine, which is insoluble in hot glacial acetic acid, is obtained.

| Microanalysis: | % | C | H | N | Cl |
|---|---|---|---|---|---|
| | calculated | 69.71 | 3.89 | 7.74 | 9.79 |
| | found | 69.7 | 4.0 | 7.8 | 9.7 |

EXAMPLE 52

Following an analogous procedure to Example 17, the corresponding amount of 2-naphthol, in place of 4-hydroxycoumarin, is initially introduced, with orthoformic acid triethyl ester and aniline, into 100 parts by volume of ethylene glycol, whereby 2-hydroxy-1-N-phenyl-aldiminenaphthalene is obtained in 78% yield.

| Microanalysis: | % | C | H | N |
|---|---|---|---|---|
| | calculated | 82.57 | 5.30 | 5.66 |
| | found | 82.33 | 5.28 | 5.64 |

What we claim is:
1. Process for the manufacture of bis-azomethine metal complex colorants of the formula

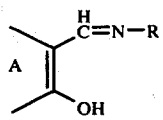

wherein A denotes an isocyclic or heterocyclic aromatic radical, X denotes an isocyclic or heterocyclic aromatic radical to which the N-atoms are bonded in the o-position or peri-position, or an alkylene radical containing 2–8 C atoms, and M denotes a divalent transition metal ion, a zinc ion or cadmium ion, characterised in that an o-hydroxyaldimine compound of the formula

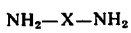

wherein A has the abovementioned meaning and R denotes an alkyl, cycloalkyl or aryl radical, is reacted with a diamine of the formula $NH_2—X—NH_2$ wherein X has the abovementioned meaning, in the molar ratio of 2:1, in the presence of a compound which donates a divalent transition metal cation, zinc ion or cadmium ion.

2. Process according to claim 1, characterised in that the starting material is an o-hydroxyaldimine compound wherein A denotes a benzene, naphthalene, anthraquinone, pyridine, pyrimidine, pyrazole, imidazole, quinoline, isoquinoline or coumarin radical.

3. Process according to claim 2, characterised in that the starting material is an o-hydroxyaldimine compound, wherein the radical A denotes a benzene, naphthalene, anthraquinone, pyridine, pyrimidine, pyrazole, imidazole, quinoline, isoquinoline or coumarin radical which can be substituted by one or more alkyl groups containing 1–6 C atoms, phenyl radicals to which halogen atoms or alkyl groups containing 1–6 C atoms are optionally bonded, hydroxyl, cyano, nitro or carboxyl groups, alkanoylamino groups containing 2-6 C atoms, benzoylamino groups, alkylsulphamoyl groups containing 1-6 C atoms or carbamoyl groups which can contain N-phenyl radicals which are optionally substituted by halogen or by alkyl or alkoxy groups containing 1-6 C atoms.

4. Process according to claim 3, characterised in that the starting material is an o-hydroxyaldimine compound wherein the radical A denotes a 3-naphthoic acid anilide, 2,4-dihydroxyquinoline or coumarin radical.

5. Process according to claim 1, characterised in that the starting material is an o-diamine of the formula

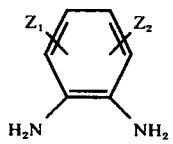

wherein $Z_1$ and $Z_2$ denote hydrogen, halogen, alkyl containing 1-6 C atoms, alkoxy containing 1-6 C atoms, arylalkyl containing 8-10 carbon atoms, trifluoromethyl, nitro, carboxyl, phenylcarbamoyl, alkylcarbamoyl containing 2-6 C atoms, phenylsulphamoyl, alkylsulphamoyl containing 1-6 C atoms, alkanoylamino containing 2-6 C atoms, benzoylamino or alkylsulphonylamino containing 1-6 C atoms, or wherein the two radicals $Z_1$ and $Z_2$ form a fused benzene ring or hetero-ring.

6. Process according to claim 1, characterised in that the starting material is an o-hydroxyaldimine compound wherein R denotes a phenyl radical which is optionally substituted by halogen atoms or by alkyl or alkoxy groups containing 1-6 C atoms.

7. Process according to claim 1, characterised in that the starting compound which donates a devalent metal ion is a nickel compound or copper compound.

8. Process according to claim 7, characterised in that the starting compound is the acetate, stearate, chloride, sulphate, nitrate or phosphate of nickel or copper.

9. Process according to claim 1, characterised in that the reaction is carried out at a temperature of 100° to 150° C.

10. Process according to claim 1, characterised in that the reaction is carried out in a polar solvent.

11. Processs according to claim 10, characterised in that the reaction is carried out in methylcellosolve, carbitol, dimethylformamide, glycol or glacial acetic acid.

12. Process according to claim 1, characterised in that the o-hydroxyarylaldimine compounds of the formula

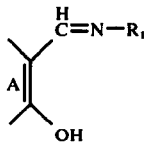

wherein $R_1$ denotes an aryl radical, are manufactured by reaction of a compound of the formula

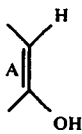

with a formamidine of the formula

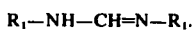

$R_1-NH-CH=N-R_1.$

13. Process according to claim 1, characterised in that the o-hydroxyarylaldimine compounds of the formula

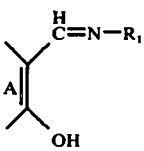

wherein A has the meaning indicated in claim 1 and $R_1$ denotes an aryl radical, are manufactured by reaction of a compound of the formula

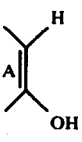

with an ortho-formic acid ester of the formula

$HC(OR_2)_3$ wherein $R_2$ denotes an alkyl radical containing 1-6 carbon atoms, and an amine of the formula

$R_1 13\ NH_2.$

* * * * *